United States Patent [19]

Claxton et al.

[11] 4,044,600

[45] Aug. 30, 1977

[54] TIRE CURE AND HEAT TRANSFER SIMULATOR

[75] Inventors: William E. Claxton, Mogadore; Harold C. Holden, Clinton, both of Ohio

[73] Assignee: The Firestone Tire & Rubber Company, Akron, Ohio

[21] Appl. No.: 498,395

[22] Filed: Aug. 19, 1974

Related U.S. Application Data

[63] Continuation of Ser. No. 222,345, Jan. 31, 1972, abandoned, which is a continuation of Ser. No. 1,799, Jan. 9, 1970, abandoned.

[51] Int. Cl.² .................... B29H 5/02; G01N 25/00
[52] U.S. Cl. ............................... 73/15 R; 235/151.3; 264/236; 425/29; 425/170
[58] Field of Search ............... 73/15, 15.4; 264/40, 264/236, 247, 315, 326; 235/151.30, 151.31, 151.34; 425/29, 30, 143, 170, 144, 169

[56] References Cited

U.S. PATENT DOCUMENTS

| 3,049,410 | 8/1962 | Warfield et al. ............... 73/15 X |
| 3,102,425 | 9/1963 | Westman et al. ............... 73/15 X |
| 3,649,729 | 3/1972 | Davis et al. ...................... 73/15 |

FOREIGN PATENT DOCUMENTS

| 1,531,572 | 5/1968 | France ............................... 73/15 |
| 1,108,478 | 4/1968 | United Kingdom ............... 73/15 |

OTHER PUBLICATIONS

Paschkis, "A Study of Curing of Tires", in Rubber Age, vol. 69, No. 1, 4/51, pp. 45–50.
Claxton et al., "Calculation of State of Cure in Rubber Under Variable Time-Temp. Conditions", in Rubber Age, 5/64, pp. 237–244.

*Primary Examiner*—Herbert Goldstein

[57] ABSTRACT

Heat transfer through a pneumatic tire being cured is simulated using a linear or two-dimensional network of resistors and capacitors. Voltages are provided by thermocouples to each end of the network, the quantity of each voltage corresponding to the internal and external temperature of the tire in the curing mold. The temperature at any point within the tire can be determined by tapping off the voltage at the corresponding point along or within the network. This voltage can then be processed to calculate an equivalent cure factor and can also be utilized to open the curing press when a desired curing state is reached at the internal point being monitored. The apparatus in addition to being used in conjunction with an actual tire cure can also be used in the laboratory where voltages can be imposed to represent hypothetical cure temperature conditions. Further, such laboratory uses can utilize simulation networks having different parameters so that the device operates in an accelerated or fast time as opposed to the real time of an actual cure, and can also, by applying pulsed voltages, simulate heat build-up conditions in a running tire.

17 Claims, 4 Drawing Figures

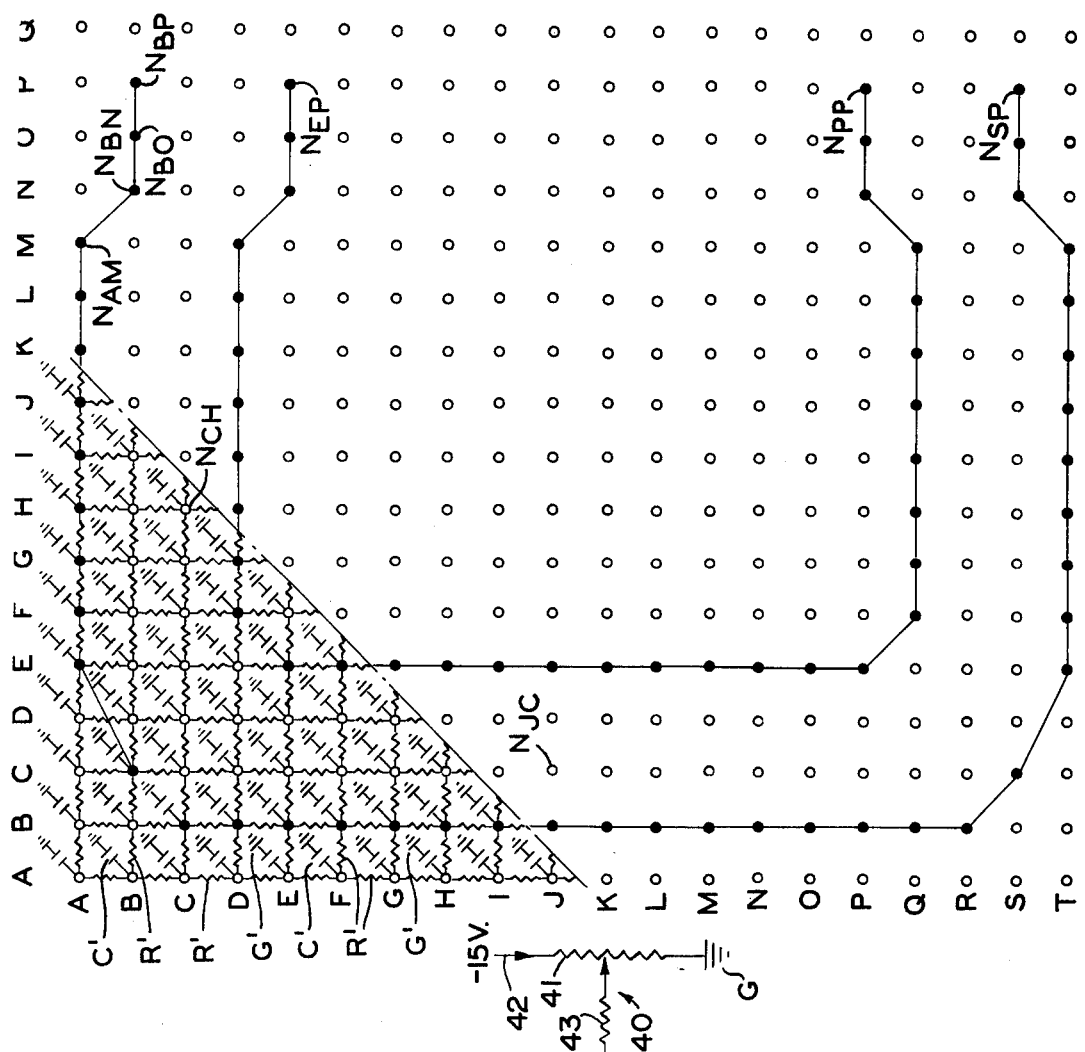
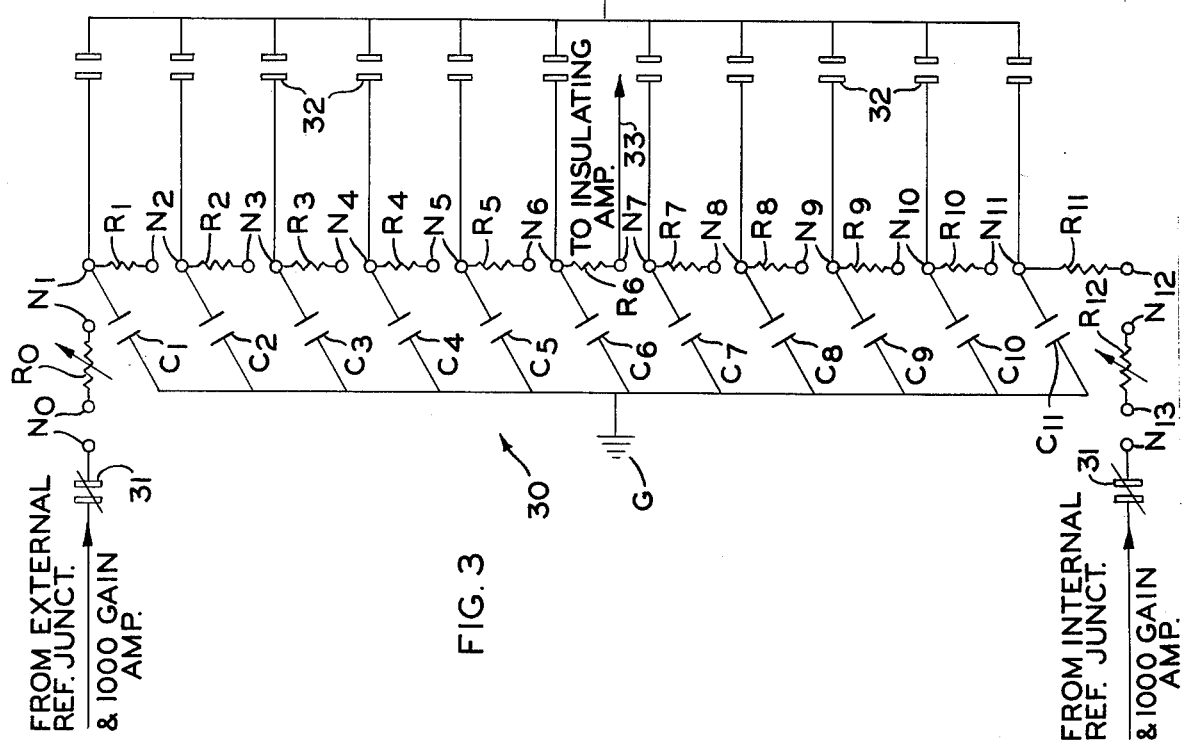
FIG. 4
FIG. 3

TIRE CURE AND HEAT TRANSFER SIMULATOR

This is a continuation of application Ser. No. 222,345 filed Jan. 31, 1972, now abandoned, which was a continuation of application Ser. No. 1799 filed Jan. 9, 1970, now abandoned.

BACKGROUND OF THE INVENTION

This invention relates to an apparatus for simulating the cure of a pneumatic tire and calculating an equivalent cure therefor. More specifically, this apparatus can be utilized to monitor an actual tire cure and operate the curing press to open the mold when a desired cure state is reached or can be utilized in a laboratory under artificial curing conditions to predict the outcome of a cure or temperature transfer characteristics of a different rubber compound in a particular tire configuration.

The curing or vulcanization of a pneumatic tire is not an exact science, the result of the process varying widely dependent on the rubber compound, tire configuration and enumerable other variables. However, it is highly desirable for the rubber compounder to be able to predict what will occur during the vulcanization of a compound in terms of temperature and corresponding period of time needed to vulcanize each compound or group of compounds used for a variety of shapes and sizes of tires.

To this end, a standard has been developed known as an "equivalent cure", which normally refers to the period of time needed to cure a tire at the equivalent of a reference temperature, usually 300° F. Stated another way, the rubber compounder issues instructions for each particular tire indicating that it must be cured for a certain time period which has been determined by use of some type of equivalent cure calculations.

Previously, the manner in which the compounder makes this determination has varied; but whatever the method utilized, it has long been an empirical process, the compounder never being certain how the addition or substitution of another polymer will change the vulcanization outcome. The most satisfactory method of testing a new compound has been to implant a thermocouple in a green tire and thereafter cure it in a standard tire vulcanization press, that is, one having a curing medium such as steam injected into a curing bag internally of the tire which is positioned in a heated mold. The thermocouple transmits a voltage to a recording pen which plots a curve representing the temperature of the internal points being monitored as a function of time. Once a satisfactory tire is produced from a test cure, the curve derived therefrom is then analyzed to determine the equivalent cure for that compound in the particular tire configuration. The compounder may find, for example, that the thinner sidewall portion of the tire is adequately cured at an equivalent cure (300° standard) of 22 minutes while the thicker tread portion may need 27 minutes of equivalent cure to vulcanize properly. Thus, to prevent an ovecuring of the sidewall portions of the tire, an adjustment is made in the compound and the tests run again until approximately one equivalent cure time for the whole tire is established.

While such a process is sufficiently accurate, it has proved quite time consuming and tedious in practice. Initially, the precise placement of the thermocouple involves tedious hand labor requiring much time in threading the wires through each tire, mold, etc. to the recording pen. Further, once the plot is made, then extensive hand calculations are required to determine the time period of the equivalent cure. While such calculations can be performed by a digital computer, usually the expense of the same is not warranted. Finally, it should be evident that the locations of the thermocouples are the only points being monitored and, short of an infinite number of thermocouples, inconsistencies could exist. Thus, there has long been a need for a device which would automatcially record and display the state of cure and calculate the equivalent cure at any instant. Further, it has not been possible to economically perform the desired tests in the laboratory without utilizing an expensive tire vulcanizing press, nor has it been possible to experiment with different temperatures of the curing medium and other variables to determine what the heat transfer effects would be.

It has been known that the heat transfer characteristics of a substance could be simulated by an electronic resistance-capacitance network. Heat transfer is proportional to the conductivity of the material (K) divided by the product of the density ($\rho$) and the specific heat ($C_v$). The known simulation methods can give real time heat transfer simulation by matching resistors to the conductivity factor; matching capacitors to the specific heat of the particular material; and matching the virtual length of the network to the density of the material. However, each time the compound is changed and therefore the heat transfer characteristics changed, the electrical parameters must be adjusted accordingly. For this reason, simulated networks have not been readily usuable by the compounder in conducting the aforementioned tests.

Even when the compounder arrives at what he feels, through tedious study and calculation, will be an adequate equivalent cure for a particular compound, the actual curing time of each individual tire may vary appreciably. For example, once it is determined that the compound used in a particular tire must have an equivalent cure of 25 minutes to adequately vulcanize the thick tread shoulder area (which may take 32 minutes of actual vulcanization time), it may be the case that, due to a slightly different compounding or slightly different press conditions or temperatures, some tires would have a 25 minute equivalent cure after 31 minutes of vulcanization. Until now, no device has been available which would either automatically end the curing cycle or tell the operator to do so.

Further, tire compounding often necessitates predictions of the effect of heat build-up in tires during actual running conditions. The standard manner in which this is now accomplished is to implant thermocouples in the tires and run them at a test site where empirical time-temperature curves may be obtained. Again, such a procedure is most time consuming and expensive to undertake.

SUMMARY OF THE INVENTION

It is therefore a primary object of the present invention to provide an apparatus to be used in conjunction with a pneumatic tire vulcanization press which can calculate, record and directly display the equivalent cure or the cure state at any point internally of the tire.

It is another object of the present invention to provide an apparatus, as above, which will automatically end the curing cycle and open the tire vulcanization press when a desired equivalent cure is reached at any point internally of the tire.

It is still another object of the present invention to provide an apparatus, as above, which simulates actual curing conditions so that it can be used in laboratories as well as in conjunction with a tire vulcanization press.

It is yet another object of the present invention to provide an apparatus, as above, which can simulate a cure and calculate and display an equivalent cure without the need of implanting thermocouples in the tire, thus doing away with the need for complex human analysis.

It is also an object of the present invention to provide an apparatus, as above, which can simulate the heat build-up conditions in a running tire.

It is a further object of the present invention to provide an apparatus, as above, which can operate in an accelerated or fast time when not being used in conjunction with the real time factor of an actual cure.

It is a still further object of the present invention to provide an apparatus, as above, which is capable of monitoring numerous points during the simulated tire cure.

These and other objects which will become apparent from the following description are accomplished by improvements hereinafter described and claimed.

In general, the heat transfer characteristics of a tire are simulated by either a linear or a two-dimensional resistance-capacitance network. Each end of the linear network, or each side of the two-dimensional network, is provided with a constant or time-varying voltage corresponding either to actual temperature conditions in a tire curing press or to hypothetical temperatures imposed for purposes of simulation of different curing conditions. Pulsed voltages of varying magnitudes may be applied internally to simulate heat sources such as produced in a running tire. The voltage at any point within or along the network may be monitored, that point corresponding to an internal location of the tire. The voltage is amplified and referred to an anti-log function module which provides a proper input to an integrator to calculate the equivalent cure. The output of the integrator can be read directly on a meter and can also be utilized as the input to a relay comparator which is supplied with another reference input so that when the actual input matches the reference input the relay actuates and opens the vulcanizing press and otherwise ends the curing cycle.

When operated in conjunction with the tire press, the device is, of course, operating on real time. However, when utilized in a laboratory on an experimental basis, the resistance and capacitance parameters can be varied so that the device will perform its calculations in an accelerated or fast time, thus simulating a cure in a fraction of the time needed to perform the actual curing process.

BRIEF DESCRIPTION OF THE DRAWINGS

FIG. 3 is a schematic diagram of a linear simulation network and green tire temperature potentiometer depicted in block form in FIG. 1.

FIG. 4 is a schematic-diagrammatic view of a two-dimensional simulation network depicted in block form in FIG 1.

DESCRIPTION OF THE PREFERRED EMBODIMENTS

Figure 1:
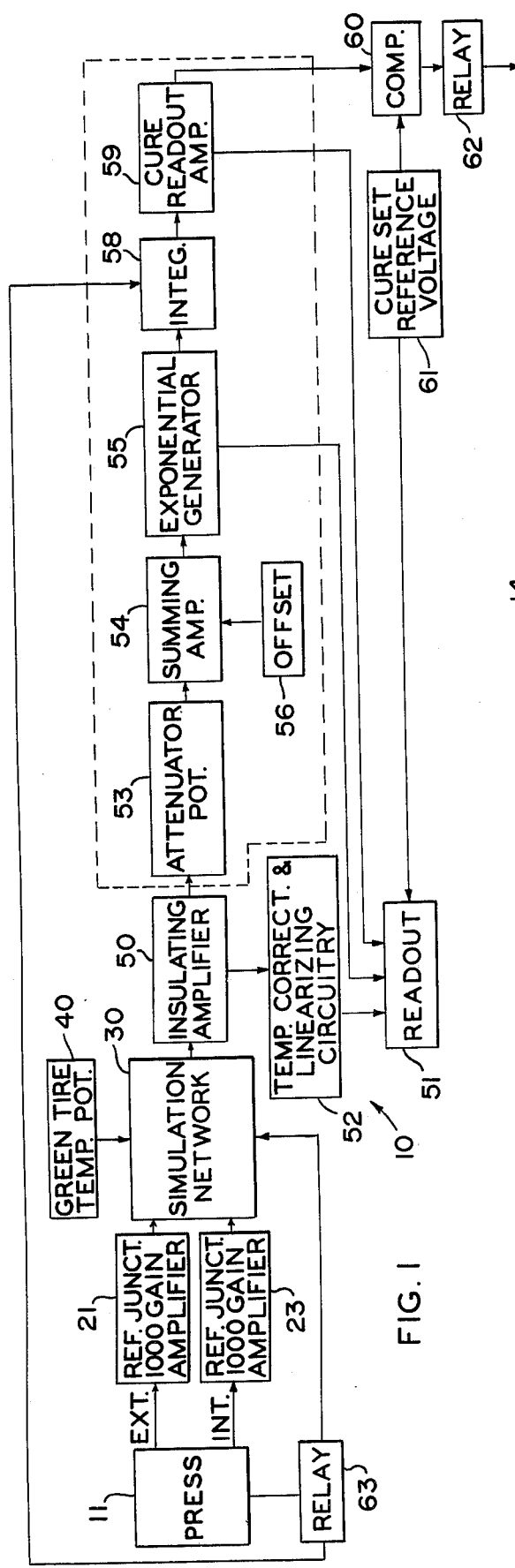
FIG. 1 is a block schematic diagram of a tire cure simulating apparatus constructed according to the concept of the present invention.
Figure 2:
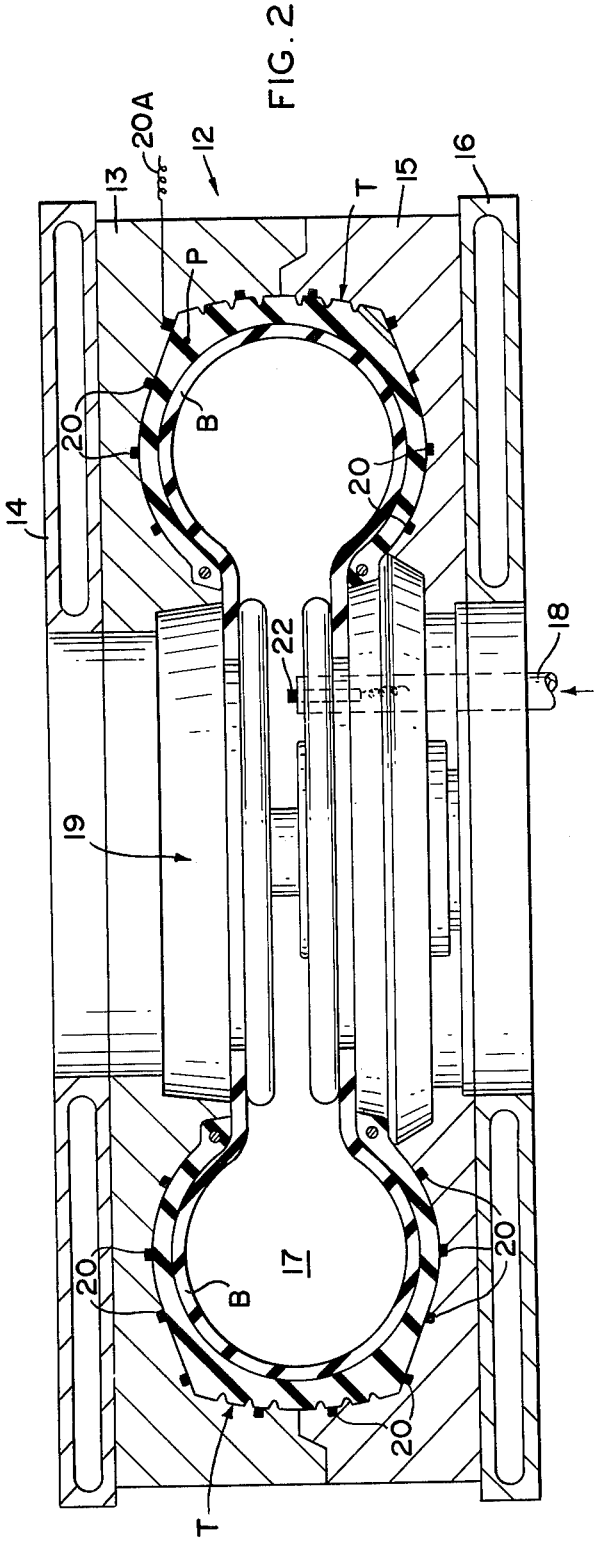
FIG. 2 is a sectional view of a tire in a mold depicting therefor a portion of a tire vulcanizing press shown in block form in FIG. 1.

A tire cure and heat transfer simulator capable of calculating an equivalent cure is indicated generally by the numeral 10 in FIG. 1 and is shown as being used with any conventional tire curing press 11 such as the types described in U.S. Pat. Nos. 2,495,663 or 2,730,763, to which reference is made for such details as may be necessary to fully understand this invention. The mold area of such a typical press 11 is designated by the numeral 12 in FIG. 2 as generally consisting of an annular upper mold section 13 heated by platen 14 and a lower annular mold section 15 heated by platen 16. When closed as shown in FIG. 2, mold sections 13 and 15 form a cavity 17 for shaping and curing of a tire T. Within the tire T is a curing bag or bladder B into which a curing medium, such as hot water or steam, is directed through input piping 18. Standard center mechanisms and bladder clamping devices are indicated generally by the numeral 19 and described in detail in the aforementioned patents. Thus when a tire is in the condition shown in FIG. 2, it is cured or vulcanized by the application of internal heat through bladder B and external heat through mold sections 13 and 15.

A plurality of standard thermocouples 20, shown schematically in FIG. 2, can be embedded at various points within the mold sections 13 and 15. A signal can be obtained from any of the thermocouples 20 which is proportional to the mold temperature near the tire surface at any given time. The thermocouple 20A is located proximate the thick shoulder area of the tire, and, because it is the key area to monitor, it will be used hereinafter as a typical example. The signal from thermocouple 20A then provides the external temperature input to a combined reference junction compensator and amplifier unit 21 which in the preferred embodiment is a 1000 gain amplifier converting the milli-volt output of the standard thermocouple into a usable range. The reference junction compensator portion of unit 21 is a standard device which automatically refers the output of a particular thermocouple 20 to a reference temperature of 32° F. The compensator thus replaces the usual ice bath utilized with most thermocouples.

Provided internally of the bladder B is another standard thermocouple 22 which is shown as monitoring the temperature of the curing media at the input piping area 18. While elaborate systems of averaging a plurality of thermocouple readings from inside bladder B could be devised, it has been found that providing a single thermocouple 22 at the input piping 18 produces a sufficiently accurate monitoring of the internal temperature of the tire. The signal from thermocouple 22 is, like that from the thermocouple 20-A, provided to a reference junction compensator and 1000 gain amplifier unit 23 which, like unit 21, refers the output of thermocouple 22 to a reference temperature of 32° F. and amplifies the output into a more usable voltage range.

The signals from the units 21 and 23 representing the external and internal thermocouple readings are supplied to each end of the sumulation network indicated generally by the numeral 30, the linear version thereof being shown in detail in FIG. 3.

Network 30 generally consists of a plurality of resistors R and capacitors C connected between nodes N and ground G. The circuitry shown is designed such that any number of the resistance-capacitance units shown can be selectively wired together. That is, each or any of the nodes $N_0$ through $N_{13}$, inclusive, can be wired together as may be desirable. As shown in FIG. 3, the position of the resistors $R_0$ through $R_{12}$, inclusive, is as follows: variable resistor $R_0$ is between nodes $N_0$ and $N_1$; resistors $R_1$ is between nodes $N_1$ and $N_2$; resistor $R_2$ is between nodes $N_2$ and $N_3$; and consecutively numbered resistors $R_3$ through variable resistor $R_{12}$ are similarly connected between consecutive nodes $N_3$ and $N_{13}$, inclusive, respectively. The various corresponding capacitors $C_1$ through $C_{11}$, inclusive, are located between nodes $N_1$ through $N_{11}$, inclusive, respectively, and ground G.

Each node $N_0$ through $N_{13}$, inclusive, is represented by two nodal points in FIG. 3 having common subscripts. This is, of course, a convenient manner of pictorially demonstrating that any number of the resistance-capacitance units can be placed together. For example, if the entire network is to be utilized, each of the nodal points $N_0$ through $N_{13}$, inclusive, bearing the common subscript indicia would be wired to each other and also the nodal points $N_0$ through $N_{13}$ would be connected to form one long chain. As will hereinafter become evident, such a situation would occur if the tire being simulated was very thick such as a truck or off-the-road tire. On the other hand, if the tire was very small, such as a bicycle tire, it may be necessary to utilize only a certain few of the nodes. Thus, in a smaller tire situation, node $N_0$ might be wired to node $N_6$; the two nodal points $N_7$ wired together; and node $N_8$ wired to node $N_{13}$, thus utilizing only resistors $R_6$ and $R_7$ and capacitors $C_6$ and $C_7$.

Since it is known that the heat transfer characteristics of a compound is determined by the formula $K/\rho C_v$ where $K$ equals heat conductivity, $\rho$ equals density, and $C_v$ equals specific heat, and also known that the aforementioned parameters can be simulated electrically wherein K is proportional to $1/R$ (R being resistance), $C_v$ being proportional to C (capacitance) and $\rho$ being proportional to virtual length of the network, it should be evident that once the heat transfer rate of a particular rubber compound is determined empirically, that rate can be simulated merely by adding or subtracting resistance-capacitance units of a fixed resistance and capacitance. In the network 30, then, it has been found that it is possible to simulate the rubber used in tires by 10 megohm resistors and 10 microfarad capacitors with it then being necessary to determine the number of said resistors and capacitors for each type of tire based on empirical heat transfer results. If it is found, for example, that the smaller bicycle tire can be simulated by 20 megohms and 20 microfarads, then only two such resistance-capacitance units of the network are needed, as described hereinabove. Should certain tires have characteristics calling for uneven multiples of 10 megohms, the variable resistors $R_0$ and $R_{12}$ are necessary to provide the fine tuning.

The signals from the units 21 and 23 are provided, through normally closed relay contacts 31, to each end of the chain of resistors R and capacitors C, the length of the chain, of course, being predetermined for the particular tire being cured. The output of the network 30 can then be taken from any node within the closed chain. In the example shown in FIG. 3, the output is being taken through line 33 from node $N_7$ which may correspond to the proximate center of the tire at the thick shoulder area indicated by point P in FIG. 2. It should be evident, however, that if it were desired to read the temperature of the tire at a point closer to the bladder B, for example, then the output of network 30 would be taken from a higher numbered code N (within the connected circuit) closer to the input signal from unit 23. Conversely, outputs taken from nodes closer to the input from unit 21 would give voltage readings representing the temperature of the tire at points closer to the mold.

A plurality of normally open relay contacts 32, the purpose of which being hereinafter explained, are provided between each node $N_1$ through $N_{11}$, inclusive, and ground G. Further, as is shown schematically in FIG. 1 and in more detail in FIG. 3, a green tire temperature potentiometer system 40 is provided as a compensating or supplement input to network 30. A potentiometer 41 is wired between a voltage source 42 and ground G, and provides a supplemental input to each node $N_1$ through $N_{11}$, inclusive, representative of the ambient temperature of the green tire. Thus, if the network 30 is simulating a cure in the summer months, the initial temperature of the green tire may be higher and therefore the potentiometer 41 adjusted accordingly. A resistor 42 limits the current through the relay contacts 32.

The output of the simulation network 30 through line 33 is provided to an insulating amplifier 50 with a field effect transistor input stage thus assuring a high input impedance on the order of $10^{12}$ ohms. As such, the voltage into amplifier 50 equals the voltage out of the amplifier and thus this device serves not only to isolate the computing or calculating portion of the circuit (enclosed in dotted lines in FIG. 1) from the network 30 but also enables the computing portion of the circuit to safely draw more current. The voltage out of amplifier 50 then corresponds to the temperature reading at a selected point within the tire being cured. If desired, this voltage could be transmitted to the readout station 51 and then compared with thermocouple calibration tables provided by the manufacturer to correlate volts to degrees Fahrenheit and therefore determine the temperature at the point P being monitored. Or more conveniently, the signal from amplifier 50 can be transmitted to a temperature correction and linearizing unit 52 which, in effect, duplicates electrically, through standard electrical elements, the manual task of utilizing the thermocouple calibration tables, thereby providing a direct read out of temperature at station 51.

The voltage out of the amplifier 50 is adjusted by an attenuation potentiometer 53 which decreases the voltage to a summing amplifier 54, to correspond to the desired input to an exponential function generator 55, as will hereinafter become evident. The summing amplifier 54 receives and inverts this attenuated voltage and adds it to the output of an offset circuitry 56. The offset circuitry shifts the X axis component to match the output of the particular exponential function generator 55 selected. The amount of offset as well as the amount of attenuation may well vary depending on the specific characteristics of the exponential function generator.

The exponential function generator 55 performs calculations according to the equation in common use in the rubber industry for converting an increment of time $\Delta t$ at an absolute temperature $\theta$ into a corresponding increment $\Delta t_r$ at reference temperature $\theta_r$ which is the Arrhenius type equation $$\frac{\Delta t_r}{\Delta t} = e^{\frac{E\Delta\theta}{R\theta_r^2}}$$

where E equals the activation energy in calories per mole R is the universal gas constant in calories per mole per degree Kelvin, and $\Delta\theta$ equals $\theta - \theta_r$ in degrees Kelvin. By taking the logarithm of the above equation it is found that $$\ln\frac{\Delta t_r}{\Delta t} = \frac{E\Delta\theta}{R\theta_r^2}$$

from which it is evident that a plot of $\Delta t_r/\Delta t$ versus temperature on semi-log paper will result in a straight line.

In view of the above, a standard anti-log module can be provided as the exponential function generator 55 so that the output thereof is the anti-log of the input. The output of the exponential generator 55 is provided to an integrator 58 and can also be provided to the readout system 51. This latter feature, of course, would be one of convenience, providing a facile method by which the generator 55 could be checked to determine whether it is functioning properly.

The integrator 58 receives the output of the function generating antilog module 55 which output, in the above equation, is the variable $\Delta t_r$. As shown, to obtain the total time $t_r$ (equivalent cure time at a reference temperature), $\Delta t_r$ is integrated with respect to time using the electronic integrator 58, the output of which represents the equivalent cure time (at 300° F. for example). A cure readout amplifier 59 converts the integrator voltage output into time in minutes so that the equivalent cure can be read out directly at readout station 51. The voltage from the amplifier 59 is also sent to a comparator unit 60, which compares the amplifier 59 output voltage with a cure set reference voltage imposed from system 61. The reference voltage system 61 merely consists of a voltage source and potentiometer which is adjusted to provide the comparator 60 with a signal proportional to the desired equivalent cure for a particular tire. The present setting of system 61 can be monitored by the readout system 51. When the signal from the amplifier 59 matches the reference signal 61, the comparator 60 activates a relay 62 which in turn causes the curing cycle to end and the mold 12 to open. The opening of the mold 12 causes the relay system 63 to close the contacts 32 so that all remaining voltage in the network 30 is reset to the green tire temperature voltage. At this same time contacts 31 are opened, and contacts within the integrator network are closed so that the integrator is reset and the entire unit cleared. Closing of the vulcanizing press with a new green tire therein reverses all of the above-noted contacts and the simulator is ready for further calculations.

From what has been said above, it is clear that the readout unit 51 can be utilized to display numerous outputs such as voltage, temperature, or equivalent cure. The unit 51 can be standard meter or it should be appreciated that the circuitry described herein could be easily adapted to provide a direct digital readout. Further, a plotter could be provided in place of the readout unit so that various time plots could be obtained. The most common of such plausible plots would be the display of the temperature of a given point as a function of time, the use of which will be hereinafter described.

Shown in FIG. 4 is a two-dimensional version of the simulation network 30 which can readily be used with the computing system just described. This network consists of vertical columns of nodes N lettered A through Q. inclusive, and horizontal lines of nodes lettered A through T, inclusive. Between each node is a resistor R'; and capacitors C' are located between each node and ground G'. Just as the desired number of resistors and capacitors are wired together in the FIG. 3 linear version, a first set of nodes in FIG. 4 are connected (via patch wires) to form the outline of the external portion of a tire in contact with the mold, a second set of patch wires forming the inside portion of a tire. The outline formed need not, of course, be the exact shape of a tire but can closely approximate a tire cross-section. Further, the outline need not be the exact size of a tire but could be a magnified cross-section of a particular portion of a tire with the parameters adjusted accordingly.

In the example shown, node $N_{BP}$ (first subscript letter indicating the horizontal line of nodes from the vertical axis indicia and second subscript letter indicating the vertical column indicia of nodes from the horizontal axis at the top of FIG. 4) is wired to node $N_{BO}$ which is connected to node $N_{BN}$ and then to node $N_{AM}$ and the sequence continues, as indicated by the lines in FIG. 4, until one external stringer ends at node $N_{SP}$. The voltage from a thermocouple 20, representing the external curing temperature, is applied to this stringer. The internal stringer receives the voltage from thermocouple 19 and consists of, in the FIG. 4 example, the stringer beginning with the node $N_{EP}$ and ending with node $N_{PP}$ to complete the internal circuit.

From the above-described configuration, it should be evident that one is able to determine the temperature at any nodal point internally of the tire, not being limited to those linear points in FIG. 3. For example, by tapping off the voltage at node $N_{CH}$, one would be able to determine and calculate the equivalent cure of that portion of the sidewall of the tire; while node $N_{JC}$ would provide representative readings centrally of the tread area of the tire.

Both the linear network configuration of FIG. 3 and the two-dimensional configuration of FIG. 4 have been described as being used in conjunction with a tire curing press 11 and therefore an actual cure. It should be evident, however, that one could replace the actual voltages from the thermocouples with impressed voltages of desired amounts from a standard voltage source. In so doing, one could determine the effects of various combinations of internal and external temperatures on the curing of a tire simulated by a network 30. The utilization of the expensive tire curing press and an actual tire would be unnecessary. It should also be appreciated that heat transfers other than that encountered in cures could be simulated. For example, voltages could be applied to simulate temperature conditions in a running tire. A tire in actual operation builds up heat when in contact with the road surface. Thus it has been found that a pulsed voltage could be applied to proper nodes at intervals dependent on tire speed.

When utilized with an actual tire cure, the above-described device was required to operate in the real time of a tire, while when utilized on an artificial basis with impressed voltages, the circuitry may be operated in a fast time in a manner now to be described. Let it be assumed that a real time plot of temperature versus time has been made by a plotter utilized as the readout 51 of the simulator 10. This plot would have been obtained for a set of resistance-capacitance parameters such as the 10 megohm resistors and 10 microfarad capacitors previously described as being proportional to the equation $K/\rho C_r$. Remembering that the conductivity K is proportional to 1/R merely halving the size of the resistors, for example, would double the heat transfer rate and therefore allow one to obtain the same curve in a shorter period of time thus operating in a fast time.

It should also be appreciated that once a time scale is established for one set of thermal parameters of a specified material, one can simulate the transfer conditions of another material without changing the value of the resistors and capacitors. For example, assuming that the proper resistors and capacitors have been determined for one particular material and the proper time axis sweep rate calibrated, then the correct curve for a material having different heat transfer parameters can be obtained without changing the value of the resistors and capacitors. This is accomplished by varying the sweep rate along the X or time axis. Thus, if the new material to be tested had a known heat conductivity K of twice that of the calibrated material (that material for which the resistors and capacitors were determined), one need only halve the sweep rate in this example keeping the time scale constant on the horizontal axis, rather than changing the values of the resistors and/or capacitors. Likewise, a material having a specific heat ($C_v$) of twice that of the calibrated material would be simulated by doubling the sweep rate and maintaining resistors and capacitors of the same size.

From the foregoing it should now be evident that a tire cure and heat transfer simulator constructed according to the concept of the present invention as described herein will carry out the aforementioned objectives. Whether the network utilized is linear or two-dimensional, the temperature of a point internally of the tire can be monitored as a function of time and can be displayed graphically or on a meter. Further, the equivalent cure can be calculated, displayed, and utilized to open a tire curing press. It has also been demonstrated that curves can be artificially obtained for any material once the device has been calibrated for a known material. Such curves can be made to represent the heat build-up characteristics in a running tire. Likewise once a real time curve has been obtained, it is a simple matter to change network parameters to operate in fast time. Therefore, it should be appreciated the device described herein substantially improves the simulating art.

We claim:

1. Apparatus for simulating the heat transfer in a tire to determine the state of cure of the tire comprising means for generating a first input voltage signal in accordance with the temperature proximate the external surface of the tire, means for generating a second voltage input signal in accordance with the temperature proximate the internal surface of the tire, simulation network means having at least one resistor representative of the heat conductivity parameter of the tire and at least one capacitor representative of the specific heat parameter of the tire, the length of said network means being representative of the physical dimension of the tire, said network means receiving said first and second voltage signals and providing a selective output signal in accordance with the temperature of a selective point internally of the tire, means establishing said selective output signal as an exponential representation of the temperature of said selective point internally of the tire relative to a reference temperature, and integrator means for integrating said exponential output signal to provide a signal proportional to an equivalent cure factor.

2. Apparatus according to claim 1 having comparator means receiving a pre-selected reference signal proportional to a desired equivalent cure factor and comparing said reference signal with said signal proportional of the equivalent cure factor, said comparator means selectively providing an actuation signal when said signal proportional to the equivalent cure factor equals said pre-selected reference signal.

3. Apparatus according to claim 2, wherein said tire is in a tire curing press having upper and lower mold sections forming a mold cavity containing the tire, said tire receiving a curing media internally thereof during a curing cycle of the press, said means for generating said first input voltage comprising first thermocouple means located in one of said mold sections proximate the external surface of the tire, said means for generating said second input voltage comprising second thermocouple means in communication with the curing media, and relay means receiving said actuation signal to end said curing cycle and open said upper and lower mold sections.

4. Apparatus according to claim 3, wherein said relay means is connected to said network means and closes normally open contact means to discharge said simulation network means and opens normally closed contact means to reset said integrator means.

5. Apparatus according to claim 1, wherein potentiometer means is connected to said network means and provides a supplemental input to said simulation network means proportional to the ambient temperature of the tire.

6. Apparatus according to claim 1, wherein said means for generating a first input voltage signal is a first voltage source means and said means for generating a second input voltage signal is a second voltage source means.

7. Apparatus according to claim 6, having means to selectively read out voltage values from said network means and from said integrator means.

8. Apparatus according to claim 7, wherein said means to selectively read out voltage values is a meter.

9. Apparatus according to claim 7, wherein said means to selectively read out voltage values is a plotter.

10. Apparatus according to claim 1, wherein said means establishing said exponential output signal of said network means includes exponential function generating means providing a signal which is the anti-log of said output signal of said network means.

11. Apparatus according to claim 10, wherein cure readout amplifier means is connected to said integrator means to calibrate the signal from said integrator means so that the equivalent cure factor can be read out directly in minutes of time.

12. Apparatus according to claim 1, wherein said simulation network means includes a plurality of nodes, a resistor between each node and an adjacent node, a capacitor between each node and ground, the outline of the external portion of the tire being formed by connecting a plurality of said nodes together and the outline of the internal portion of the tire being formed by connecting a plurality of said nodes together, said first input voltage signal being provided to said outline of the external portion of the tire and said second input voltage signal being provided to said outline of the internal portion of the tire, said output signal of said simulation network means being taken from a node between said outlines of the external and internal portions of the tire.

13. Apparatus according to claim 12, wherein one of the resistors connected to a first and last nodes is a variable resistor.

14. Apparatus for simulating the heat build-up in a running tire comprising, means to generate a first pulsed voltage signal to simulate the temperature proximate one of the internal and external surfaces of the running tire, means to generate a second pulsed voltage signal to simulate the temperature proximate an internal point of the running tire, simulation network means having at least one resistor representative of the heat conductivity parameter of the tire and at least one capacitor representative of the specific heat parameter of the tire, the length of said network means being representative of the physical dimension of the tire, said network means receiving said first and second pulsed voltage signals including said second signal being applied at an internal point in said simulation network means, said network means providing selective output signals proportional to the temperature of a selective point internally of the running tire, and means for reading out said signals proportional to the temperature of a selective point internally of the running tire.

15. Apparatus for use with the tire cure press for calculating the state of cure of a tire in the press in terms of equivalent cure factors, comprising, means for measuring the temperature of the internal and external surface of the tire simulator network means for obtaining a signal simulating the temperature of a selected point internally of the tire from the internal and external surface temperature of the tire, means for modifying said simulated signal to a form appropriate for exponentiation, exponential function generating means receiving the modified signal and providing an output signal which is the antilog thereof, and integrator means receiving said output signal and providing the signal proportional to an equivalent cure factor.

16. Apparatus for simulating the heat transfer in a tire to determine the state of cure of the tire comprising means for generating a first input voltage signal proportional to the temperature proximate the external surface of the tire, means for generating a second input voltage signal proportional to the temperature proximate the internal surface of the tire, simulation network means having at least one resistor representative of the heat conductivity parameter of the tire and at least one capacitor representative of the specific heat parameter of the tire, the length of said network means being representative of the thickness of the tire, said network means receiving said first and second input voltage signals and providing selective output signals proportional to the temperature of a selective point internally of the tire, exponential function generating means providing a signal which is an exponential function of said output signal of said network means, and integrator means receiving said exponential function signal and providing a signal proportional to an equivalent cure factor.

17. Apparatus for simulating the heat transfer in a tire to determine the state of cure of the tire comprising means for generating a first input voltage signal proportional to the temperature proximate the external surface of the tire, means for generating a second input voltage signal proportional to the temperature proximate the internal surface of the tire, simulation network means having at least one resistor representative of the heat conductivity parameter of the tire and at least one capacitor representative of the specific heat parameter of the tire, the length of said network means being representative of the thickness of the tire, said network means receiving said first and second input voltage signals and providing selective output signals proportional to the temperature of a selective point internally of the tire, exponential function generating means providing a signal which is an exponential function of said output signal of said network means, integrator means receving said exponential function signal and providing a signal proportional to an equivalent cure factor, and comparator means receiving a preselected reference signal proportional to a desired equivalent cure factor and comparing said reference signal with said signal proportional to the equivalent cure factor, said comparator means selectively providing an actuation signal when said signal proportional to the equivalent cure factor equals said preselected reference signal.

* * * * *

UNITED STATES PATENT AND TRADEMARK OFFICE
CERTIFICATE OF CORRECTION

PATENT NO. : 4,044,600
DATED : August 30, 1977
INVENTOR(S) : William E. Claxton and Harold C. Holden It is certified that error appears in the above-identified patent and that said Letters Patent are hereby corrected as shown below:

Column 1, line 3: Delete "now abandoned"

Column 5, line 9: Delete "and" - insert instead through

Column 6, line 3: Delete "code" - insert instead node

" ", line 15: Delete "supplement" - insert instead supplemental

" ", line 22: Delete "42" - insert instead 43

Column 9, line 60: Before voltage, insert input

Column 10, line 4: Delete "of" - insert instead to

Column 11, line 28, After "tire" - insert ,

Signed and Sealed this

Twenty-fourth Day of January 1978

[SEAL]

Attest:

RUTH C. MASON
Attesting Officer

LUTRELLE F. PARKER
Acting Commissioner of Patents and Trademarks